United States Patent Office 3,474,107
Patented Oct. 21, 1969

3,474,107
N-AROMATIC SUBSTITUTED ACID AMIDES
Kurt Thiele, Frankfurt am Main, Germany, assignor to Deutsche Gold- und Silber-Scheideanstalt vormals Roessler, Frankfurt am Main, Germany
No Drawing. Filed Nov. 13, 1967, Ser. No. 682,616
Claims priority, application Germany, Nov. 16, 1966, D 51,561; Sept. 1, 1967, D 53,982
Int. Cl. C07d 31/44; A61k 25/00
U.S. Cl. 260—295.5      4 Claims

ABSTRACT OF THE DISCLOSURE

N-aromatic substituted acid amide compounds of the formula

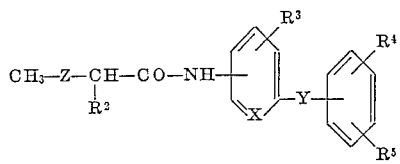

wherein:

$$Z \text{ is } \underset{O}{\underset{\|}{-C-}}, \underset{OH}{\underset{|}{-CH-}} \text{ or } \underset{O\text{-acyl}}{\underset{|}{-CH}}$$

wherein the acyl is the acyl group of a lower aliphatic, preferably, alkyl carboxylic acid or of a mono-aliphatic, preferably, alkyl ester of carbonic acid,
$R^2$ is H or lower alkyl,
$R^3$ is H, halogen, lower alkyl or lower alkoxy,
each of $R^4$ and $R^5$ taken individually is hydrogen, halogen, lower alkyl, nitro, trifluoromethyl, lower alkoxy, lower alkyl amino, amino, hydroxy, acyl-oxy as defined above or acyl-amino as defined above,
X is =N— or =CH— and
Y is —CH₂— or —NH—
and wherein when Z is

X is CH and Y is NH at least one of $R^2$, $R^3$, $R^4$ and $R^5$ is other than hydrogen.

Such compounds have valuable pharmaceutical properties, such as, anti-inflammatory, analgesic, anti-pyretic and/or anti-spasmodic properties.

DISCLOSURE OF THE INVENTION INCLUDING SPECIFIC EMBODIMENTS

The novel compounds according to the invention which have been described above can be prepared by conventional methods, for instance, by reacting a compound of the formula

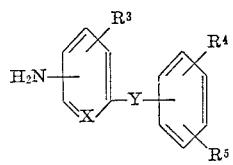

with an acid of the formula

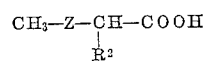

or its corresponding halide, ester, amide, anhydride or ketene.

The compounds according to the invention when they contain basic centers can be converted to their pharmaceutically acceptable acid addition salts. Also, in the event they are racemates they can be resolved into the optically active isomeric components. Optionally active starting materials also can be employed right from the start.

The compounds according to the invention, as already indicated, possess valuable pharmaceutical properties, among which are analgesic, anti-pyretic, anti-spasmodic and especially anti-inflammatory properties although in some instances compounds may exhibit some of such properties to a greater extent than the others and in some instances, for instance, some of such properties may be lacking.

The dosages in general, for example, can be between about 1 and 300 mg./kg. oral. The compounds are well tolerated, for example, their acute toxicity with mice expressed as $LD_{50}$ in mg./kg. is between 700 and 4000 mg./kg.

The compounds according to the invention can, for example, be divided into the following groups based on chemical constitution and activity.

(A) Diphenyl methane and pyridyl phenyl methane derivatives (compounds of Formula I wherein Y=CH₂). This group of compounds has an especially good anti-inflammatory action and a weaker analgesic action.

| Compound of Example No. | Anti-inflammatory action in percent | Analgesic Action |
|---|---|---|
| 5 | 67 | Present. |
| 6 | 66 | Do. |

(B) Aceto acetyl amino-diphenyl amine derivatives (compounds of Formula I wherein Y=NH, X=CH and

These compounds also have anti-inflammatory action but no analgesic action.

| Compound of Example No. | Anti-inflammatory action in percent | Analgesic Action |
|---|---|---|
| 4 | 46 | None. |
| 8 | 31 | Do. |

(C) Hydroxy butyramino-diphenyl amine derivatives (compounds of Formula I wherein Y=NH, X=CH and

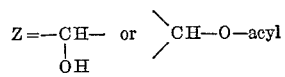

which possess a strong anti-inflammatory action and in addition a good analgesic action and in some instances anti-pyretic and anti-spasmodic action.

| Compound of Example No. | Anti-inflammatory Action in percent | Analgesic action, $ED_{50}$ in mg./kg., oral | Anti-pyretic action, $ED_{50}$ in mg./kg. | Antispasmodic action in percent with dosage oral, 25 mg./kg. |
|---|---|---|---|---|
| 3 | 94 | 71–85 | 17 | 32 |

(D) Acetoacetyl-phenyl amino pyridine derivatives (compounds of Formula I wherein Y=NH, X==N—, and

These compounds have pharmaceutical activities similar to those of group A, namely, good anti-inflammatory action but weaker or no analgesic action.

| Compound of Example No. | Anti-inflammatory action in percent | Analgesic Action |
| --- | --- | --- |
| 1 | 62 | Present. |
| 7 | 27 | None. |
| 9 | 82 | Do. |
| 10 | 80 | Present. |
| 10a | 81 | Do. |
| 10b | 34 | None. |
| 10c | 87 | Do. |
| 13 | 35 | Do. |

(E) Hydroxy butyramino-phenylamino-pyridine derivatives (compounds of Formula I wherein Y=NH, X= =N—, and

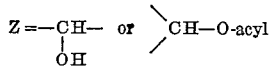

The activity of these compounds is similar to that of the compounds of group A and of group D. Analgesic activity has only been found present in one of such compounds and in this instance it is very strong.

| Compound of Example No. | Anti-inflammatory action in percent | Analgesic Action |
| --- | --- | --- |
| 2 | 82 | None. |
| 14 | 51 | Very strong. |
| 15 | 43 | None. |
| 16 | 92 | Do. |
| 17 | 87 | Do. |

The anti-inflammatory action was ascertained by the method according to Domenjoz et al., Arch. exp. Pharm. Path. 230, 325, 1957, at a 300 mg./kg. oral dosage and the anti-inflammatory action expressed in percent of reduction of edema in ovalbumen edema of the rat paw as against untreated controls. The anti-inflammatory action is of the same type as the action of the known anti-inflammatory agent phenyl butazone.

The analgesic action was ascertained by the mouse tail test according to Haffner, Deutsche Med. Wochenschrift 55, 731, 1929, with oral dosages of 1 to 500 mg./kg.

The anti-pyretic action was ascertained on yeast fever in rats (O. Büch, Arch. intern. Pharmacodyn. 123, 140, 1959).

The anti-spasmodic action was ascertained by tests on whole animals (rats) by measurement of the reduction in intestinal motility by measurement of the degree to which the passage of the test meal through the small intestine was slackened.

The application of the compounds according to the invention can be oral, perlingual, parenteral or in the form of an aerosol.

The following examples will serve to illustrate the novel compounds according to the invention.

Example 1.—2-phenylamino-5-aceto acetyl amino-pyridine

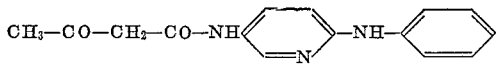

(a) 6.8 g. (0.081 mol) of diketene were added portionwise at 20° C. to a solution of 15 g. (0.081 mol) of 2-phenyl-amino-5-amino-pyridine in 100 ml. of dioxane. After the addition was completed, the mixture was stirred for a further 30 minutes. The crystallized product which already started to precipitate out during the addition of the diketene was filtered off and recrystallized from isopropanol/petroleum ether. The melting point was 153–154° C. and the yield 11 g.

(b) A suspension of 18.5 g. (0.1 mol) of 2-anilino-5-amino-pyridine in 100 ml. of xylene, to which 3 drops of pyridine had been added, was added in the course of 1½ to 2 hours at 135–140° C. to a mixture of 15.6 g. (0.12 mol) of freshly distilled aceto acetic acid ester, 100 ml. of p-xylene and 3 drops of pyridine in a 500 ml. 4-necked flask provided with a stirrer, dropping funnel, descending fractionating column and thermometer. About the same quantity of liquid should be distilled off at the descending condenser as is delivered from the suspension. The mixture was then heated under reflux for a further 2 hours. The product crystallized out upon cooling. Petroleum ether was added and the crystals filtered off and recrystallized twice from isopropanol/petroleum ether. Its melting point was 152–1530 C. and the yield 12.5 g.

Example 2.—2-phenylamino-5-(3-hydroxy-butyramino)-pyridine

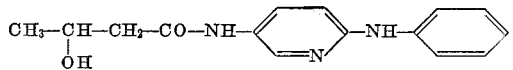

20 g. (0.0745 mol) of 2-phenylamino-5-aceto acetyl amino-pyridine were dissolved in a mixture of 120 ml. of dioxane and 400 ml. of methanol. Then 2.8 g. of sodium borohydride was added portionwise to such solution at about 5–10° C. while stirring. After completion of the addition the cooling bath was removed so that the temperature of the mixture raised to room temperature. Thereafter it was heated a short time to 50° C. and the solution concentrated under vacuum. Water was added to the solid residue and the mixture thoroughly triturated, filtered, washed several times with water, dried and recrystallized from isopropanol/petroleum ether. The product was obtained in a yield of 16 g. with a melting point of 161–162° C.

Example 3.—4-(3-hydroxy-butyramido)-diphenyl amine

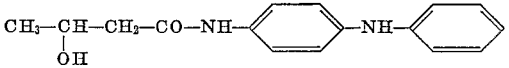

2.1 g. (0.0555 mol) of sodium borohydride were added portionwise to a solution of 15 g. (0.0555 mol) of 4-aceto acetyl amino-diphenyl amine in 100 ml. of methanol cooled to 10° C. After the reaction had ended the mixture was heated to 50° C. for about 15 minutes. The solution was concentrated with water added to the residue and the mixture thoroughly triturated, filtered, washed several times with water, dried and recrystallized with alcohol/petroleum ether. The product was otbained in a yield of 11.5 g. with a melting point of 127–128° C.

Example 4.—3-methoxy-4-aceto acetyl amino-diphenyl amine

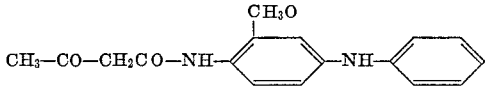

15 g. (0.07 mol) of 3-methoxy-4-amino-diphenyl amine were suspended in 100 ml. of ether and 5.9 g. (0.07 mol) of diketene added thereto while stirring. The reaction occurred very soon in that a clear solution resulted with warming from which the reaction product soon crystallized out. The reaction mixture was stirred for a further hour and the product then filtered off and recrystallized from isopropanol. Its melting point was 124–125° C. and the yield was 16 g.

Example 5.—4-aceto acetyl amino-diphenyl methane

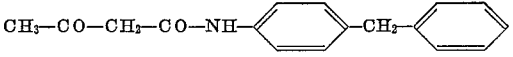

10.5 g. (0.123 mol) of diketene were added to a solution of 22.5 g. (0.123 mol) of 4-amino-diphenyl methane in 70 ml. of dioxane. During the ensuing reaction the temperature rose up to 60° C. After the solution had cooled down again 300 ml. of water were added. The oily product which separated out became solid upon trituration. It was stirred up well with water, filtered off, washed several times with water, dried and recrystallized from a mixture of gasoline (B.P. 100–140° C.) and isopropanol. The product was obtained in a yield of 21.5 g. with a melting point of 88–89° C.

Example 6.—4-(3-hydroxy-butyramido)-diphenyl methane

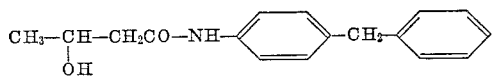

20 g. (0.075 mol) of the product of Example 5 were dissolved in 200 ml. of methanol and 2.9 g. (0.077 mol) of sodium borohydride added to the solution while stirring at 5–10° C. After the reaction ended the reaction mixture was heated for 30 minutes at 50° C. After concentrating the solution and stirring up the syrupy residue with water a crystalline substance was obtained. This was stirred up again with water, filtered off, washed with water and recrystallized from alcohol/water. The product was obtained in a yield of 17.2 g. with a melting point of 110–111° C.

Example 7.—2-phenyl amino-5-(3-oxo-2-butyl-butyramino)-pyridine

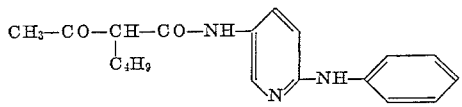

A solution of 1.2 g. of sodium (0.057 mol) in 50 ml. of alcohol was added to a solution of 14 g. (0.057 mol) of 2-phenyl-5-aceto-acetyl amino-pyridine. The mixture was heated under reflux for 2 hours and thereafter 8.2 g. (0.06 mol) of butyl bromide added thereto. The reaction mixture then was again heated under reflux for 8 hours, concentrated, the residue stirred up with water and filtered off. The product after recrystallization from alcohol/water had a melting point of 146–147° C. The yield was 7 g.

Example 8.—4-(3-oxo-2-butyl-butyramino)-diphenyl amine

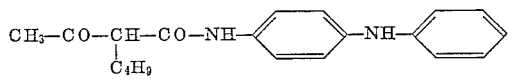

1.7 g. (0.074 mol) of sodium were dissolved in 100 ml. of alcohol and 20 g. (0.0745 mol) of 4-aceto acetyl amino-diphenyl amine added to such solution. After the mixture was heated under reflux for 30 minutes, 10.3 g. (0.075 mol) of butyl bromide were added and the mixture heated under reflux for a further 8 hours. The product which crystallized out upon standing overnight was filtered off, stirred up with water, filtered off again and recrystallized from alcohol/water. Its melting point was 142–143° C. and the yield 10 g.

Example 9.—2-(4-methyl-anilino)-5-aceto acetyl amino-pyridine

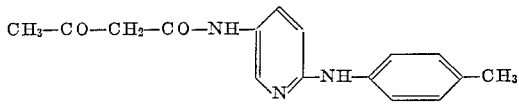

30 g. (0.15 mol) of 2-(4-methyl-anilino)-5-amino-pyridine, 12.6 g. (0.15 mol) of diketene and 300 ml. of acetone were mixed together. After about 10 minutes the mixture heated up to 40° C. After 16 hours, 300 ml. of water were added to the reaction mixture whereupon the end product crystallized out. It was filtered off and washed with water and isopropanol and then recrystallized twice from isopropanol. It had a melting point of 156–157° C. and the yield was 20 g.

Example 10.—2-(2-methoxy anilino)-5-aceto acetyl amino-pyridine

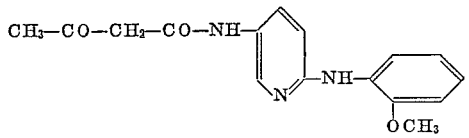

17 g. (0.079 mol) of 2-(2-methoxy anilino)-5-amino-pyridine were dissolved in 100 ml. of benzene and 8 g. of diketene (content of diketene about 84% added portionwise thereto while stirring at 20–25° C. After the addition was completed the mixture was heated to 50° C. for 30 minutes. After the reaction mixture had cooled down to room temperature, gasoline was added until the solution just began to cloud. The compound soon crystallized out and was filtered off and washed with ether. It was then dissolved in 100 ml. of hot isopropanol and filtered hot. After it had cooled somewhat 100 ml. of gasoline were added. The solution was stored in a refrigerator and the product which crystallized out filtered off, washed with 50 ml. of 1:1 isopropanol/ gasoline and dried. The yield was 13.4 g. or about 57% of theory. Its melting point was 81–82° C.

The following compounds were prepared analogously:
(a) 2-(2-ethoxy anilino)-5-aceto acetyl amino-pyridine

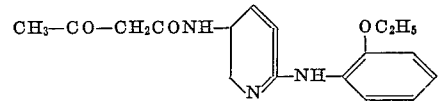

The yield was 51% of theory and its melting point was 117–118° C.
(b) 2-(4-ethoxy anilino)-5-aceto acetyl amino-pyridine

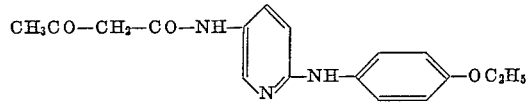

The yield was 68% of theory and after recrystallization from methanol its melting point was 152–153° C.
(c) 2-(3-trifluoromethylanilino)-5-aceto acetyl amino-pyridine

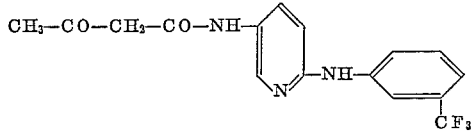

The yield was 51% of theory. After recrystallization from isopropanol its melting point was 127–128° C.

Example 11.—4-(d,l-β-acetoxy-butyramino)-diphenyl amine

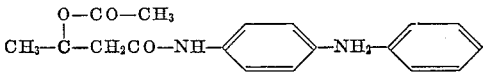

A solution of 18.8 g. (0.12 mol) of d,1-β-acetoxy butyric acid chloride in 50 ml. of benzene was gradually added while stirring to a solution of 21.1 g. (0.115 mol) of p-aminodiphenylamine in 100 ml. of benzene and 16.5 ml. of triethylamine at about 20° C. After the addition was completed the reaction mixture was stirred for a further 30 minutes at 50° C. After cooling, water and ether were added and the mixture thoroughly shaken. The organic phase was separated off, dried and concentrated. The syrupy residue solidified upon standing and was twice recrystallized from isopropanol/petroleum ether. The yield of the product was 19 g. or about 53% of theory and its melting point was 138–139° C.

Example 12.—4-(d,l-β-hydroxy-butyramino)-diphenyl amine 0.5 g. of 85% powdered caustic soda (0.76 mol) was dissolved in 50 ml. of 10% alcohol. After the addition of 2 g. of the product of Example 11 the reaction mixture was heated under weak refluxing conditions for about 2 hours. The solution was then evaporated to dryness and the residue triturated with water, filtered and dried. The product was recrystallized twice from isopropanol/petroleum ether. The yield was 0.75 g. or about 43% of theory and its melting point was 126–127° C.

Example 13.—2- 2,5-dimethoxy anilino)-5-aceto acetyl amino-pyridine 25 g. (0.102 mol) of 2-(2,5-dimethoxy anilino)- amino pyridine were dissolved in 150 ml. of acetone. Then 10 g. of 84% diketene (0.102 mol) were added gradually while stirring. After the addition was completed the mixture was stirred for a further hour at 50° C. The solution was concentrated and the residue mixed with water and the mixture shaken out with ethyl acetate. The organic phase was separated off, dried with potash, filtered and concentrated. The residue was dissolved in hot isopropanol. Upon cooling a dark viscous oil first separated out from the solution. The clear solution was poured off therefrom. The product recrystallized out from the solution and the crystallization was completed by allowing the mixture to stand over night in a refrigerator. The crystallized product was filtered off and dissolved in 70 ml. of alcohol. The solution was heated hot with charcoal and filtered. After addition of 50 ml. of gasoline the product crystallized out again. It was filtered off, washed with ether and dried. The melting point thereof was 103–104° C. and the yield 10.5 g.

Example 14.—2-(2-ethoxy anilino)-5-(β-hydroxy-butyramino)-pyridine

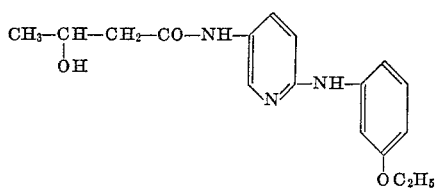

30 g. (0.096 mol) of 2-(2-ethoxy anilino)-5-aceto acetyl amino-pyridine were dissolved in 200 ml. of methanol. 3.64 g. (0.96 mol) of powdered sodium borohydride were added portionwise to the solution while stirring and while cooling the solution to maintain a temperature between +5° C. and +10° C. After the addition was completed the cooling bath was removed and after about 2 hours' standing the solution was concentrated and water added to the syrupy residue and the mixture allowed to stand for several hours. When no crystallization occurred even after such standing, the water was decanted off as much as possible and the residue dissolved in alcohol, the alcohol solution dried with potash, filtered and concentrated. 28 g. of the product were obtained. The maleic acid salt was prepared therefrom in alcoholic solution. Such salt was recrystallized from alcohol/ether. The yield was 30 g. or about 72.5% of theory. Its melting point was 138–139° C.

Example 15.—2-(4-ethoxy anilino)-5-(β-hydroxy-butyramino)-pyridine 31.3 g. (0.1 mol) of 2-(4-ethoxy anilino)-5-aceto acetyl amino-pyridine were dissolved in 400 ml. of methanol. 3.8 g. (0.1 mol) of sodium borohydride were added portionwise while stirring at room temperature. After the addition was completed the mixture was stirred for a further hour. The mixture was then concentrated and the crystallized residue placed on a filter and washed with water and with isopropanol. The crude product was recrystallized from isopropanol. The melting point of the product was 151–152° C. and the yield 16 g. or about 51% of theory.

Example 16.—2-(3-trifluoromethyl anilino)-5-(β-hydroxy-butyramino)-pyridine 16.5 g. (0.05 mol) of 2-(3-trifluoromethyl anilino)-5-aceto acetyl amino-pyridine were dissolved in 100 ml. of methanol. 2.1 g. (0.055 mol) of powdered sodium borohydride were added portionwise while stirring at room temperature and the mixture stirred thereafter for 1 hour. The solution was concentrated and water added to the crystalline residue and the mixture filtered. The resulting product was recrystallized from isopropanol with addition of water. The melting point of the product was 141–142° C. and the yield 10.5 g. or 66% of theory.

Example 17.—2-(4-ethyl anilino)-5-(β-hydroxy butyramino)-pyridine 15 g. (0.055 mol) of 2-ethyl anilino)-5-aceto acetyl amino-pyridine were dissolved in a mixture of 50 ml. of dioxane and 100 ml. of methanol. 2 g. (0.052 mol) of powdered sodium borohydride were added portionwise while stirring at 10° C. and thereafter the mixture stirred for a further 2 hours at room temperature. The solution was concentrated and water added to the syrupy residue. Upon crystallization the mixture was thoroughly stirred and the crystals filtered off, washed with water and dried. 15 g. of the dry substance were dissolved in isopropanol and the solution filtered. 200 ml. of gasoline were added to the filtered solution and the mixture stored over night in a refrigerator. The crystals which separated out were filtered off, washed with ether and dried. The melting point of the product was 118–119° C. and the yield 11 g.

Example 18

Analogously to Example 9, 4-methyl - 4'-acetoacetylaminodiphenylamine was obtained from 4-methyl-4'-aminodiphenylamine and diketene. Upon recrystallization from isopropanol the compound had a melting point of 115–116° C.

Example 19

Analogously to Example 9, 4-methoxy-4'-acetoacetylamino-diphenylamine was obtained from 4-methoxy-4'-aminodiphenylamine and diketene. Upon recrystallization from isopropanol the compound had a melting point of 128–130° C.

Example 20

Analogously to Example 2, 4-methyl-4'-(3-hydroxybutyryl)-amino-diphenylamine was obtained from 4-methyl-4'-acetoacetylamino-diphenylamine by reduction with sodium borohydride. Upon recrystallization from isopropanol the compound had a melting point of 144–145° C.

Example 21

Analogously to Example 20, 4-methoxy-4'-(3-hydroxy-butyryl)-diphenylamine was obtained from 4-methoxy-4'-acetoacetylamino-diphenylamine by reduction with sodium borohydride. Upon recrystallization from isopropanol the compound had a melting point of 132–133° C.

I claim:

1. An N-pyridyl substituted acid amide of the formula

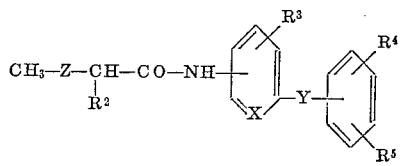

wherein Z is selected from the group consisting of

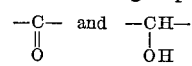

$R^2$ is selected from the group consisting of H and lower alkyl,

R³ is selected from the group consisting of H, halogen, lower alkyl and lower alkoxy, each of R⁴ and R⁵ taken individually is selected from the group consisting of H, halogen, lower alkyl, nitro, trifluoromethyl, lower alkoxy, and acyl-amino as defined in col. 1, lines 33–35, X is =N— and
Y is —NH—.

2. A compound according to claim 1, 2-(2-ethoxy anilino)-5-(β-hydroxy-butyramino)-pyridine.

3. A compound according to claim 1, 2-(3-trifluoromethyl anilino)-5-(β-hydroxy-butyramino)-pyridine.

4. A compound according to claim 1, 2-(2-ethoxy anilino)-5-aceto acetyl amino-pyridine.

References Cited

UNITED STATES PATENTS 3,375,257  3/1968  Thiele et al. _____ 260—295

HENRY R. JILES, Primary Examiner
A. L. ROTMAN, Assistant Examiner

U.S. Cl. X.R.

260—295, 296, 488, 562, 576, 999